United States Patent [19]
Inoue

[11] Patent Number: 5,799,079
[45] Date of Patent: Aug. 25, 1998

[54] OPENING AND CLOSING MECHANISM FOR ELECTRONIC DEVICE

[75] Inventor: Tsutomu Inoue, Tokyo, Japan

[73] Assignee: Mitsubishi Denki Kabushiki Kaisha, Tokyo, Japan

[21] Appl. No.: 734,844

[22] Filed: Oct. 23, 1996

[30] Foreign Application Priority Data

Nov. 30, 1995 [JP] Japan ................... 7-312568

[51] Int. Cl.$^6$ ................................................ H04M 1/00
[52] U.S. Cl. .................................. 379/433; 379/434
[58] Field of Search ............................ 379/433, 434, 379/428; 455/90, 575; 16/337, 223, 342, 297, 308, 386

[56] References Cited

U.S. PATENT DOCUMENTS 5,141,446  8/1992  Ozouf et al. ..................... 16/337
5,500,982  3/1996  Hosoi .............................. 16/342

FOREIGN PATENT DOCUMENTS 59-135959  8/1984  Japan.
6152491    5/1994  Japan.

Primary Examiner—Jack Chiang
Attorney, Agent, or Firm—Rothwell, Figg, Ernst & Kurz

[57] ABSTRACT

A portable phone incorporating an opening and closing mechanism comprises a main body, a sub-body, a hinge unit, and distribution cables. The main body and the sub-body respectively include electric circuits. The hinge unit includes a shaft disposed at one end of the sub-body, a cam having a center axis coupled to the shaft and used for regulating opening and closing angles of the sub-body, and a pair of leaf springs for maintaining turning angles of the cam. The distribution cables are connected to the electric circuits, and have their center portions wound around the shaft of the hinge unit. The distribution cables are stretched or compressed when the sub-body is opened or closed.

7 Claims, 9 Drawing Sheets

OPENING AND CLOSING MECHANISM FOR ELECTRONIC DEVICE

BACKGROUND OF THE INVENTION

1. Field of the Invention

This invention relates to an opening and closing mechanism for an electronic device, and more particularly to an opening and closing mechanism for a flip-type portable telephone including a pair of bodies which carry electric circuits, and are opened and closed with electric circuits connected.

2. Description of the Prior Art

FIG. 13 of the accompanying drawings is a perspective view of a portable telephone shown and described in Japanese Patent Laid-Open Publication No. Hei 6-152,491. The portable telephone comprises an upper body 101 and a lower body 102, which are rotatably joined via a hinge 103 disposed at one end of each body. In other words, the lower body 102 is freely opened and closed with respect to the upper body 101 via the hinge 103.

The upper body 101 houses a radio unit 104 as an electric circuit. Similarly, the lower body 102 houses a controller 105 as an electric circuit. The radio unit 104 and the controller 105 are connected by distribution cables 106 and 107. These distribution cables 106 and 107 pass through the hinge 103 which is parallel to an opening and closing direction of the lower body 102. Whenever the lower body 102 is opened or closed via the hinge 103, both the distribution cables 106 and 107 are inevitably and repeatedly twisted or untwisted by a load applied thereto. These cables 106 and 107 are usually radio frequency (RF) coaxial cables including conductors and insulation coatings.

Unfortunately, the foregoing portable telephone incorporating the opening and closing mechanism is prone to the following problems. The distribution cables 106 and 107 for connecting the radio unit 104 and the controller 105 are arranged such that they may be repeatedly twisted and untwisted at the hinge 103 whenever the lower body 102 is opened and closed. Thus, the insulation coatings of the distribution cables 106 and 107 may become damaged, which will lead to eventual breaking of the distribution cables 106 and 107. The broken distribution cables 106 and 107 will cause a poor electrical connection. Especially, whenever the lower body 102 is opened and closed through a large angle, the distribution cables 106 and 107 will be extensively and repeatedly twisted and untwisted. This will frequently result in poor electrical connections of the portable telephone.

SUMMARY OF THE INVENTION

The invention is intended to overcome the foregoing problems of the prior art.

A first object of the invention is to provide an opening and closing mechanism for an electronic device which can prevent a poor electrical connection at an opening and closing section.

A further object of the invention is to provide an opening and closing mechanism which can be manufactured at a reduced cost as well as accomplishing the foregoing object.

A still further object of the invention is to provide an opening and closing mechanism which can be efficiently assembled as well as having the foregoing advantages.

According to a first aspect of the invention, there is provided an opening and closing mechanism for an electronic device, comprising: a main body and a sub-body respectively including electric circuits; a hinge unit for joining one end of each of the main body and the sub-body, the hinge unit including a shaft attached to the end of the sub-body, a cam having a central rotation axis coupled to the shaft and being capable of setting opening and closing angles of the sub-body, and an angle regulating leaf spring for maintaining the cam at a set angle; and a distribution cable for establishing an electrical connection between the electric circuit of the main body and the electric circuit of the sub-body, the distribution cable having intermediate portions wound around the shaft of the hinge unit. The sub-body is opened and closed at the end thereof with respect to the main body via the hinge unit serving as a turning center.

In this arrangement, the distribution cable is wound around the shaft of the hinge unit. Thus, the distribution cable is stretched when the sub-body is opened, while it is compressed when the sub-body is closed. In other words, the distribution cable is not twisted or untwisted whenever the sub-body is opened or closed. This is effective in preventing the distribution cable and insulation coatings thereof from being damaged and broken, and in protecting the distribution cable against poor connections. The more loosely and the more times the distribution cable is wound around the shaft, the less stress (i.e. tension and compression) will be applied to the distribution cable. This is also effective in protecting the distribution cable against breaking and poor electrical connection.

The distribution cable and the electric circuits of the main body and the sub-body are connected via a conductive and flexible cable.

The conductive and flexible cable can reduce the tension applied to the distribution cable applied by the opening of the sub-body, which is effective in preventing breaking and poor electrical connection of the distribution cable, and in enlarging opening and closing angles of the sub-body.

In accordance with a second aspect of the invention, there is provided an opening and closing mechanism for an electronic device, comprising: a main body and a sub-body respectively including electric circuits; a hinge unit for joining one end of each of the main body and the sub-body, the hinge unit including a shaft for opening and closing the sub-body at the end thereof with respect to the main body; and a distribution cable for establishing an electrical connection between the electric circuit of the main body and the electric circuit of the sub-body, the distribution cable having at least flexible intermediate portions wound around the shaft of the hinge unit. Thus, the sub-body is opened and closed at the end thereof with respect to the main body via the hinge unit serving as a turning center.

This arrangement is also effective in preventing the breaking of the distribution cable and poor electrical connections. The flexibility of the distribution cable at its intermediate portion wound around the shaft of the hinge unit can dispense with the cam for regulating the opening and closing angles of the sub-body and the angle regulating leaf spring. This simplifies the hinge unit, and the overall structure of the opening and closing mechanism. This further leads to a reduction of the manufacturing cost.

According to a third aspect of the invention, there is provided an opening and closing mechanism for an electronic device, comprising: a main body and a sub-body respectively including electric circuits; a hinge unit for joining one end of each of the main body and the sub-body, the hinge unit including a conductive shaft attached to the end of the sub-body, a cam having a central rotation axis coupled to the conductive shaft and being capable of setting opening and closing angles of the sub-body, and an angle regulating leaf spring for maintaining the cam at a set angle; a main body distribution cable for establishing an electrical connection between the electric circuit of the main body and the conductive shaft of the hinge unit; and a sub-body distribution cable for an electrical connection between the electric circuit of the sub-body and the conductive shaft of the hinge unit. The sub-body is opened and closed at the end thereof with respect to the main body via the hinge unit serving as a turning center.

The third aspect of the invention features that the main body and the sub-body include separate distribution cables for their electric circuits. These distribution cables are mutually connected via the conductive shaft, so that they undergo substantially no stress when the sub-body is opened or closed, i.e. they are neither twisted nor untwisted by the opening or closing of the sub-body. Thus, the distribution cables are protected against the breaking of the insulation coatings. Further, the distribution cables are prevented from being broken and suffering from poor electrical connections. The distribution cable for the main body and the distribution cable for the sub-body can be separately assembled on the main body and the sub-body. These distribution cables can be mutually connected when mounting the conductive shaft of the hinge unit on the sub-body. This simplifies the assembly work of the opening and closing mechanism.

In a fourth aspect of the invention, there is provided an opening and closing mechanism for an electronic device, comprising: a main body and a sub-body respectively including electric circuits; a hinge unit for joining one end of each of the main body and the sub-body, the hinge unit including a conductive shaft attached to the end of the sub-body, a cam having a central rotation axis coupled to the conductive shaft and being capable of setting opening and closing angles of the sub-body, and an angle regulating leaf spring for maintaining the cam at a set angle; a rubber conductor connected at one end thereof to the electric circuit and contacted, via a contact type connector at the other end thereof, with the conductive shaft of the hinge unit; and a sub-body distribution cable for establishing an electrical connection between the electric circuit of the sub-body and the conductive shaft of the hinge unit. The sub-body is opened and closed at the end thereof with respect to one end of the main body via the hinge unit serving as a turning center.

In the foregoing arrangement, the main body conductor connects to the electric circuit of the main body, and to the conductive shaft of the hinge unit via the contact type connector. Thus, the rubber conductor is in continuous contact with the conductive shaft regardless of the opening or closing of the sub-body. The rubber conductor is neither stretched nor compressed at the contact type connector when the sub-body is opened or closed. The electric circuit of the sub-body is connected to the conductive shaft via the sub-body distribution cable. This prevents the main body conductor from being twisted or untwisted. Both the main body conductor and the sub-body distribution can be protected against breaking and poor electrical connection. Further, the opening and closing mechanism can be assembled in a simple manner since the main body the contact type connector is simply contacted with the conductive shaft of the hinge unit.

The sub-body distribution cable for connecting the electric circuit of the sub-body and the conductive shaft includes a printed pattern integrally formed on the sub-body.

The printed pattern as the sub-body distribution cable simplifies the structure of the opening and closing mechanism, which is effective in reducing the number of components, assembling steps, and cost of the closing and opening device. The printed pattern is manufactured by an MID (Molded Interconnection Device) technique.

According to a fifth aspect of the invention, there is provided an opening and closing mechanism for an electronic device, comprising: a main body and a sub-body respectively including electric circuits; a hinge unit for joining one end of each of the main body and the sub-body, the hinge unit including a shaft attached to the end of the sub-body, a cam having a central rotation axis coupled to the shaft and being capable of setting opening and closing angles of the sub-body, and an angle regulating leaf spring for maintaining the cam at a set angle; a main body distribution cable which is connected at one end each thereof to the electric circuit of the main body and includes a printed contact pattern at the other end thereof; and a sub-body distribution cable which is connected at one end each thereof to the electric circuit of the sub-body and includes a printed contact pattern which is in contact with the printed contact pattern of the main body distribution cable in a moving range of the sub-body. The sub-body is opened and closed at the end thereof with respect to one end of the main body via the hinge unit serving as a turning center.

In this arrangement, the electric circuits of the main body and the sub-body are connected by their printed contact patterns. Even when the sub-body is opened or closed, these printed contact patterns are continuously in slide contact with each other. The printed contact patterns are free from tension and compression, and protected against breaking and poor electrical connection. The opening and closing mechanism can be assembled in a simplified manner since the printed contact patterns of the main body and the sub-body are simply contacted.

Both the main body distribution cable and the printed contact pattern thereof are integrally formed as a printed pattern on the main body, and both the sub-body distribution cable and the printed contact pattern thereof are integrally formed as a printed pattern on the sub-body.

The printed contact pattern on the main body and that on the sub-body simplify the connection between the electric circuits. The opening and closing mechanism can have a simple structure, comprise a reduced number of components, and be easily assembled, and is less expensive. The printed contact patterns are prepared by the MID (Molded Interconnection Device) technique.

In accordance with a sixth aspect of the invention, there is provided an opening and closing mechanism for an electronic device comprising: a main body and a sub-body respectively including electric circuits; a hinge unit for rotatably joining one end of each of the main body and the sub-body, the hinge unit including a cam having a through hole along a center rotation axis thereof and being capable of setting opening and closing angles of the sub-body, and an angle regulating leaf spring for maintaining the cam at a set angle; and a distribution cable for establishing an electrical connection between the electric circuit of the main body and the electric circuit of the sub-body, the distribution cable passing at intermediate portions thereof through a through-hole of the cam and then being wound around an outer surface of the cam. The sub-body is opened and closed at the end thereof with respect to the main body via the hinge units serving as turning centers.

In this arrangement, the distribution cable passes through the through-hole in the cam of the hinge unit, and is then wound around the outer surface of the cam. When the sub-body is opened or closed, the distribution cable is stretched or compressed, but is not twisted or untwisted. The distribution can be protected against breaking and poor electric connection. The more loosely the distribution cable is wound around the shaft, the less stress will be applied to the distribution cable. This further protects the distribution cables against breaking and poor electrical connection.

In the opening and closing mechanism, the electronic device is a flip type portable telephone.

The electric circuit of the main body may be a radio circuit of the portable telephone, and the electric circuit of the sub-body may be a control circuit of the portable telephone.

The invention will become more apparent from the following detailed description of the presently preferred embodiments when taken in conjunction with the accompanying drawings.

DESCRIPTION OF THE PREFERRED EMBODIMENTS

The invention will be described with respect to preferred embodiments which are applied to portable telephones.
Embodiment 1

Figure 1:
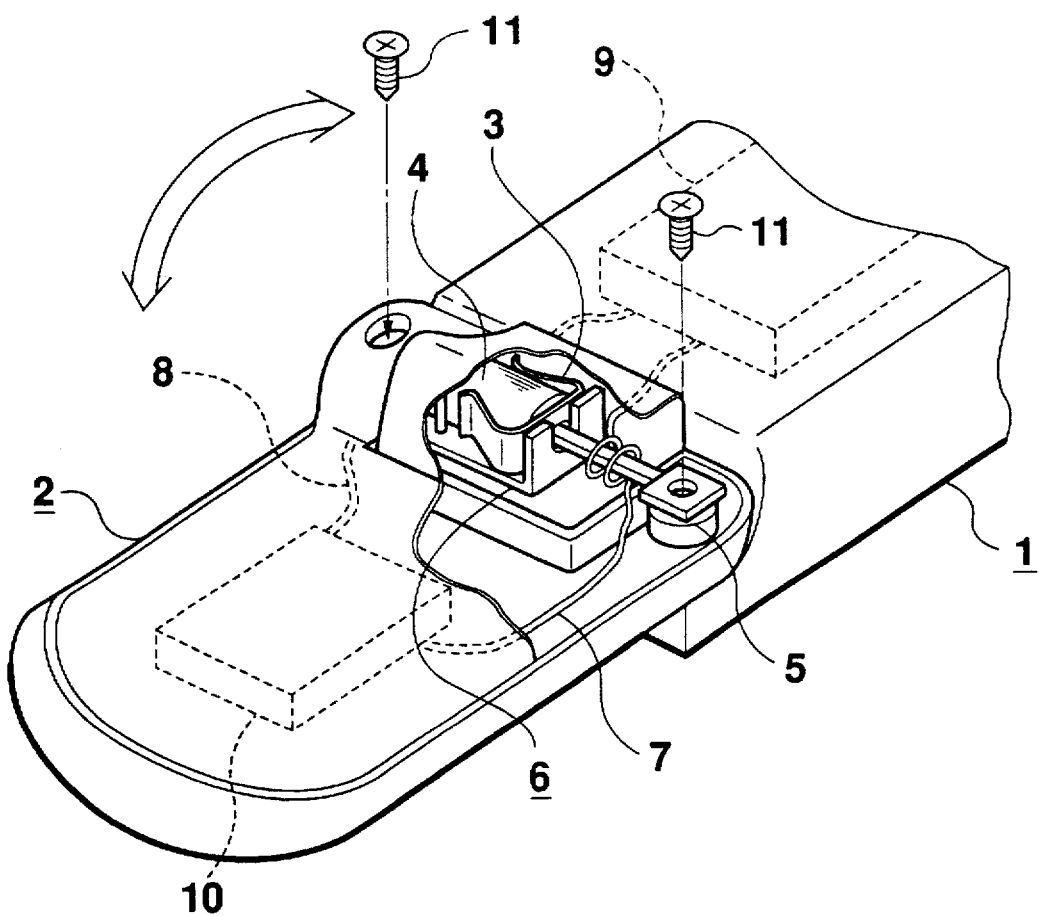
FIG. 1 is a perspective view of a portable telephone incorporating an opening and closing mechanism according to a first embodiment of the invention.

In a first embodiment, an opening and closing mechanism is incorporated into a portable telephone (called the "portable phone") as shown in FIG. 1. The portable telephone is of a flip type, and comprises a main body 1 (upper body) and a sub-body 2 (lower body). The main body 1 and the sub-body 2 are joined at their respective ends via the opening and closing mechanism which is positioned at one end of each of the main body 1 and the sub-body 2. The sub-body 2 is opened or closed with respect to the main body 1 via the opening and closing mechanism, which mainly comprises a hinge unit 6 serving as a turning center.

The hinge unit 6 includes a leaf spring 3 for regulating a turning angle of the sub-body 2, a cam 4 and a shaft 5. The leaf spring 3 is attached to the main body 1, and holds particular parts of an outer surface of the cam 4. Thus, the cam 4 is held at a particular turn angle. The leaf spring 3 is made of a material such as metal or resin.

The cam 4 has the outer surface which can set two turn angles by which the sub-body 2 is opened or closed, and is made of a material such as resin.

The shaft 5 is fixed at one end thereof to a rotary shaft of the cam 4, and is fixed at the other end thereof to the sub-body 2 using a screw 11. In this embodiment, the shaft 5 is made of metal. Alternatively, the shaft 5 may be of resin so long as it is water-resistant and durable.

The main body 1 and the sub-body 2 house electric circuits 9 and 10, respectively. For example, the electric circuit 9 is a radio unit while the electric circuit 10 is a control circuit.

The electric circuits 9 and 10 are connected using RF distribution cables 7 and 8 having conductors protected by insulation coatings. The distribution cables 7 and 8 are wound, at their center portions, around the shaft 5 of the hinge unit 6. The distribution cables 7 and 8 are stretched or compressed, instead of being twisted or untwisted, in the hinge unit 6 whenever the sub-body 2 is opened or closed.

Figure 2:
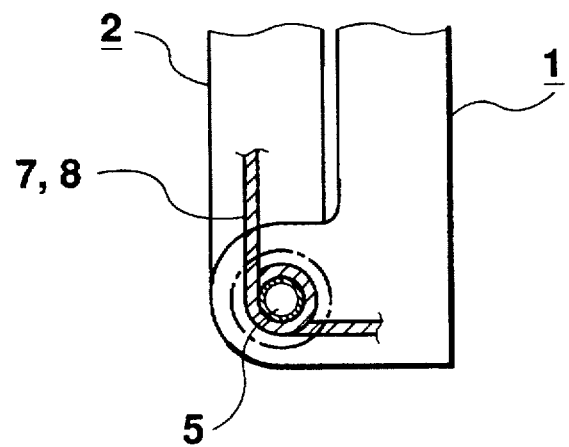
FIG. 2 is a cross section of the main part of the opening and closing mechanism when the portable telephone is in a closed state.
Figure 3:
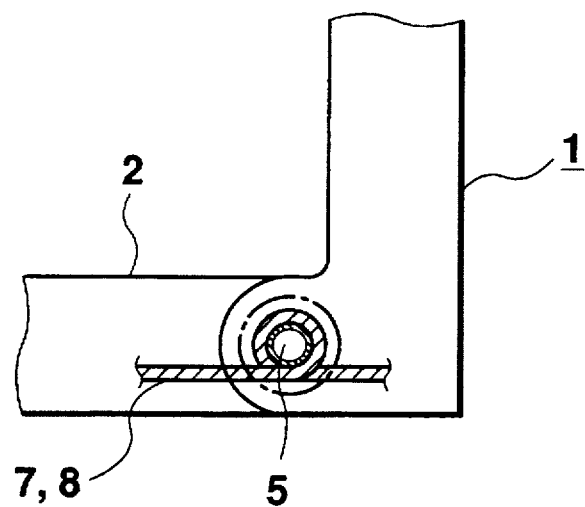
FIG. 3 is a cross section of the main part of the opening and closing mechanism when portable telephone is in an opened state.

Referring to FIG. 2, the closure of the sub-body 2 compresses the distribution cables 7 and 8. Conversely, the opening of the sub-body 2 stretches the distribution cables 7 and 8 as shown in FIG. 3. Thus, the more loosely the distribution cables 7 and 8 are wound, the less stress (i.e. tension and compression) will be applied to them.

In the portable phone shown in FIG. 1, the distribution cables 7 and 8 loosely wound around the shaft 5 are not twisted or untwisted when the sub-body 2 is opened or closed. Thus, the distribution cables 7 and 8 are protected against breakage and poor electrical connection. Further, the more loosely and the more times the cables 7 and 8 are wound around the shaft 5, the less stress will be applied to these cables 7 and 8. This prevents the distribution cables 7 and 8 from the breaking and poor electrical connection.
Embodiment 2

Figure 4:
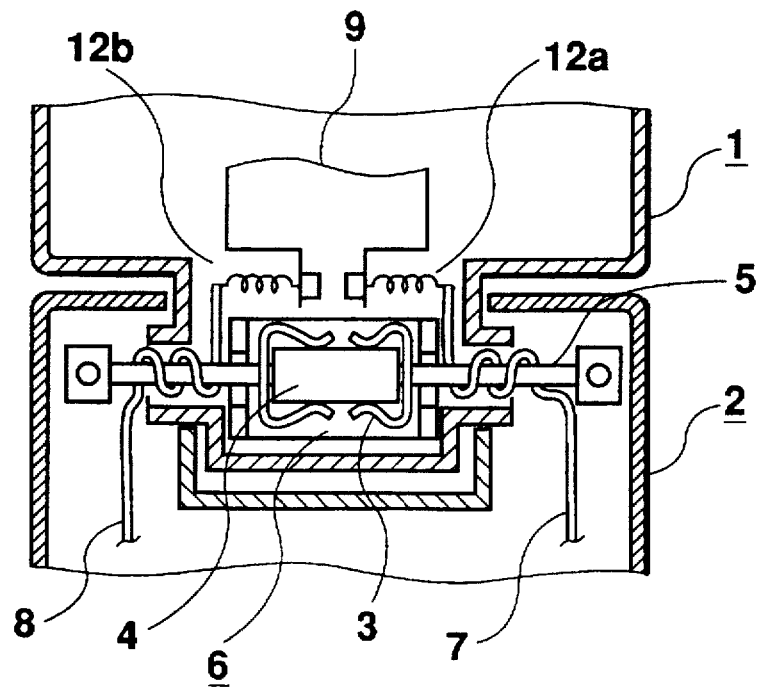
FIG. 4 is a top view of an opening and closing mechanism according to a second embodiment of the invention.

In this embodiment, flexible cables are used in the portable phone referred to in the first embodiment. Referring to FIG. 4, distribution cables 7 and 8 are connected to the electric circuit 9 via a pair of stretchable cables 12a and 12b. The stretchable cables 12a and 12b are conductive and helical, and are stretchable in the direction in which the distribution cables 7 and 8 are arranged in the hinge unit 6. The stretchable cables 12a and 12b may be covered by insulation coatings if necessary.

Further, the distribution cables 7 and 8 may be also connected to the electric circuit 10, on the sub-body 2 (shown in FIG. 1), using additional helical cables 12a and 12b.

The presence of the helical cables 12a and 12b is effective in reducing the tension applied to the distribution cables 7 and 8 when the sub-body 2 is opened. Thus, it is possible to prevent the breaking of the distribution cables 7 and 8, and enables the sub-body 2 to be opened and closed through large angles.

Embodiment 3

Figure 5:
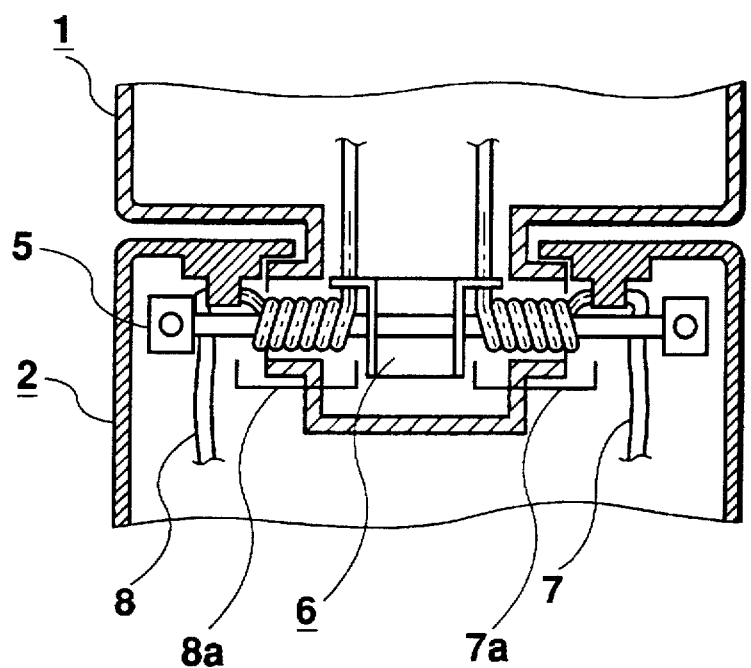
FIG. 5 is a top view of an opening and closing mechanism according to a third embodiment of the invention.

According to a third embodiment, distribution cables are partially stretchable so as to enhance opening or closing of the portable phone referred to in the first embodiment. Referring to FIG. 5, distribution cables 7a and 7b are wound around the shaft 5 in such a manner that they are stretchable on the shaft 5 in the hinge unit 6. For instance, the distribution cables 7a and 7b include curled metal conductors (i.e. in the shape of a coil spring) which are protected by insulation coatings.

In this embodiment, the distribution cables 7a and 7b are stretchable at their portions wound around the shaft 5 of the hinge unit 6. This arrangement can dispense with components such as the cam 4 and the angle regulating leaf spring 3 (both shown in FIG. 1), and simplifies the hinge unit 6, which includes only the shaft 5. Thus, the reduction in the number of components and simplification of the assembling work enables the opening and closing mechanism to become less expensive.

Embodiment 4

Figure 6:
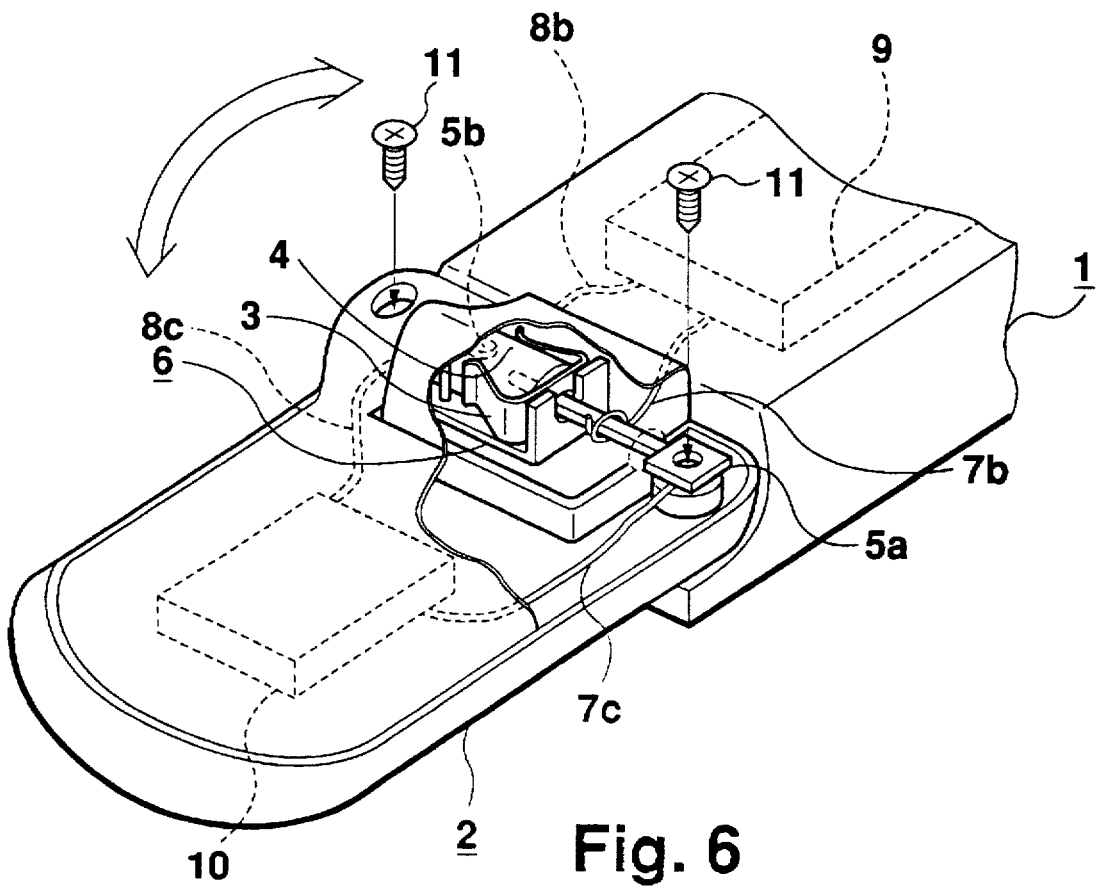
FIG. 6 is a perspective view of a portable telephone incorporating an opening and closing mechanism according to a fourth embodiment of the invention.

A fourth embodiment features that the main body and the sub-body have their own distribution cables in the portable phone. As shown in FIG. 6, the distribution cables 7 and 8 in the foregoing embodiments are independent and are separately arranged in the main body 1 and the sub-body 2.

Distribution cables 7b and 8b for the main body are connected across the electric circuit 9 (of the main body 1) and shafts 5a and 5b of the hinge unit 6. The shafts 5a and 5b have conductivity, and are made of a material such as a metal. The shafts 5a and 5b are insulated via the cam 4 which is made of an insulating material such as resin. The distribution cables 7b and 8b are connected not only to the electric circuit 9, but also to the shafts 5a and 5b by soldering, for example.

The distribution cables 7c and 8c are connected, by soldering, across the electric circuit 10 of the sub-body 2 and the shafts 5a and 5b of the hinge unit 6.

Figure 7:
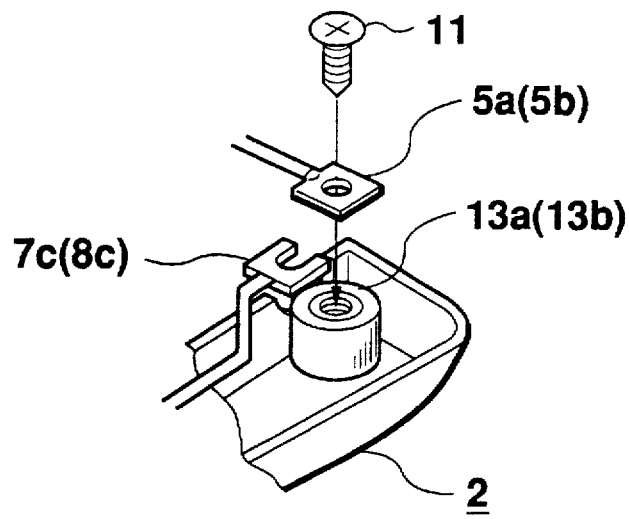
FIG. 7 is a perspective view showing the main part of a hinge unit joining a main body and a sub-body of the portable telephone.

Referring to FIG. 7, the distribution cable 7c is sandwiched between a metal insert 13a embedded in the sub-body 2 near the hinge unit 6 and an end of the shaft 5a, and is connected to the shaft 5a by driving a screw 11 into the metal insert 13a. The distribution cable 8c is similarly connected to the shaft 5b using a metal insert 13b and another screw 11.

In this embodiment, the distribution cables 7b and 8b for the electric circuit 9 (of the main body 1) are independent from the distribution cables 7c and 8c for the electric circuit 10 (of the sub-body 2). Thus, even when the sub-body 2 is opened or closed, substantially no stress is applied to the distribution cables 7b and 8b or the distribution cables 7c and 8c. Further, the distribution cables 7b, 8b, 7c and 8c are not twisted, so that they are protected against breaking and poor electrical connection. Further, since they are independent, the distribution cables 7b, 8b, 7c and 8c can be separately arranged in the main body 1 and the sub-body 2. The distribution cables 7b and 8b are connected to the distribution cables 7c and 8c connected via the shafts 5a and 5b. These connections can be efficiently made in a simplified manner.

Embodiment 5

Figure 8:
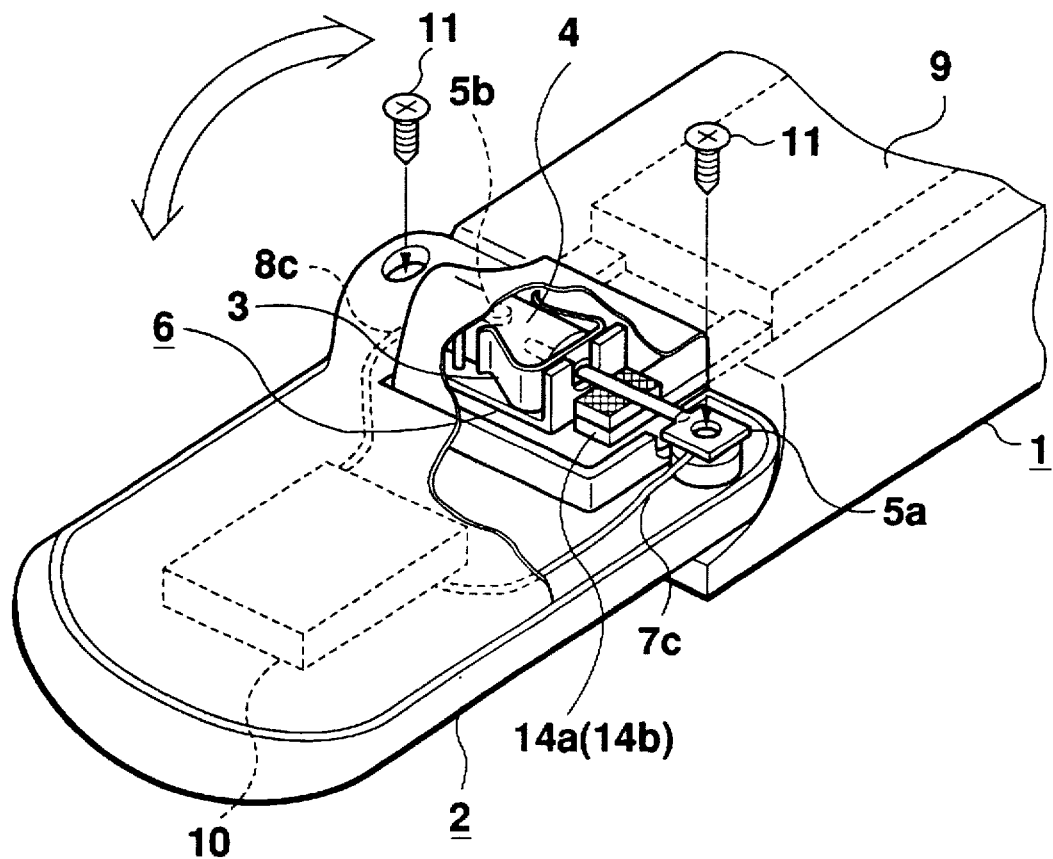
FIG. 8 is a perspective view showing a portable telephone incorporating an opening and closing mechanism according to a fifth embodiment of the invention.

In a fifth embodiment, rubber conductors (or resin conductors) are used for the main body in place of the distribution cables utilized in the fourth embodiment. Referring to FIG. 8, rubber conductors 14a and 14b replace the distribution cables 7b and 8b of the main body 1 in the fourth embodiment. At the opposite ends, the rubber conductors 14a and 14b are connected to the electric circuits 9 and 10, and are in contact with conductive shafts 5a and 5b of the hinge unit 6 via contact type connectors. Alternatively, the rubber conductors 14a and 14b may be shaped in such a manner that they have at least portions contactable with the shafts 5a and 5b. For example, the rubber conductors may include contact type connectors to be in contact with the conductive shaft 5a and 5b, and distribution cables 7b and 8b connected to the contact type connectors.

Further, the following modifications are conceivable in this embodiment. The rubber conductors 14a and 14b may be used only for the sub-body 2 in place of the distribution cables 7c and 8c. Otherwise, the rubber conductors may be used for both the main body 1 and the sub-body 2.

The rubber conductors 14a and 14b are in continuous contact with the shafts 5a and 5b via the contact type connectors, regardless of the opening or closing of the sub-body 2. Thus, the contact type connectors of the rubber conductors 14a and 14b are neither stretched nor compressed. The shafts 5a and 5b are connected to the electric circuit 10 via the distribution cable 7c and 8c. The contact type connectors 14a and 14b are never twisted or untwisted on the main body 1, which is effective in preventing the breaking and poor electrical connection of the rubber conductors 14a and 14b. The rubber conductors 14a and 14b are simply in contact with the shafts 5a and 5b via the contact type connectors, which facilitates assembly of the opening and closing mechanism. Further, the rubber conductors 14a and 14b are easily removed from the portable phone.

Embodiment 6

Figure 9:
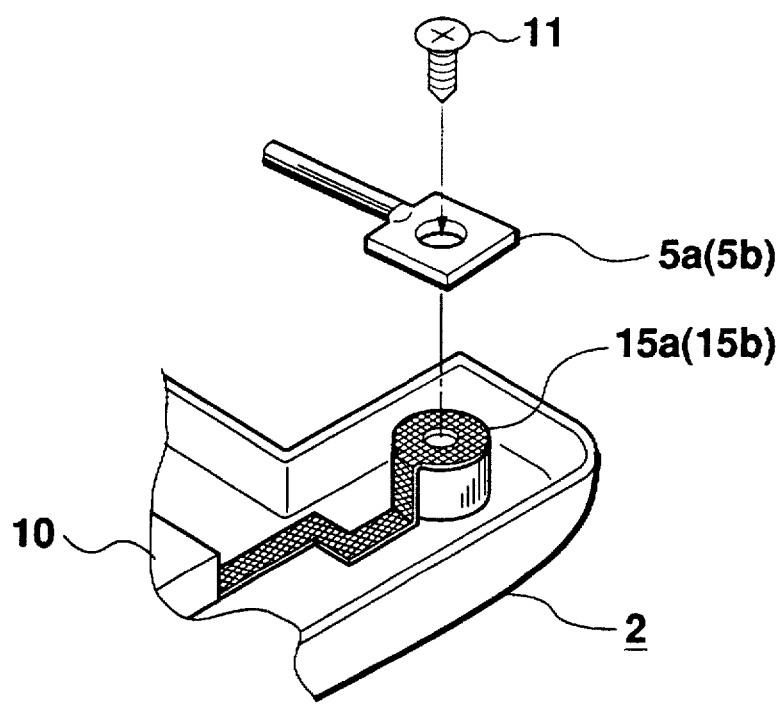
FIG. 9 is an enlarged perspective view of the main part of an opening and closing mechanism according to a sixth embodiment of the invention.

A sixth embodiment features that in the sub-body, distribution cables are printed patterns which are integral with the sub-body. Referring to FIG. 9, printed patterns 15a and 15b, which are equivalent to the distribution cables 7c and 8c in the fourth or fifth embodiment, are used to connect the electric circuit 10 to the shafts 5a and 5b. The printed patterns 15a and 15b are formed on an inner surface of the sub-body 2 by a technique such as the MID technique. In the MID technique, the sub-body (made of a resin material, for example) is formed using a mold. A conductive material (e.g. a metal) is molded on the molded sub-body so as to form printed patterns 15a and 15b.

In the sixth embodiment, the printed patterns 15a and 15b can replace the distribution cables 7c and 8c, and dispense with the metal inserts 13a and 13b. This is effective in simplifying the opening and closing mechanism, reducing the number of components, and simplifying the assembly work. Thus, the opening and closing mechanism can be made less expensive.

Embodiment 7

Figure 10:
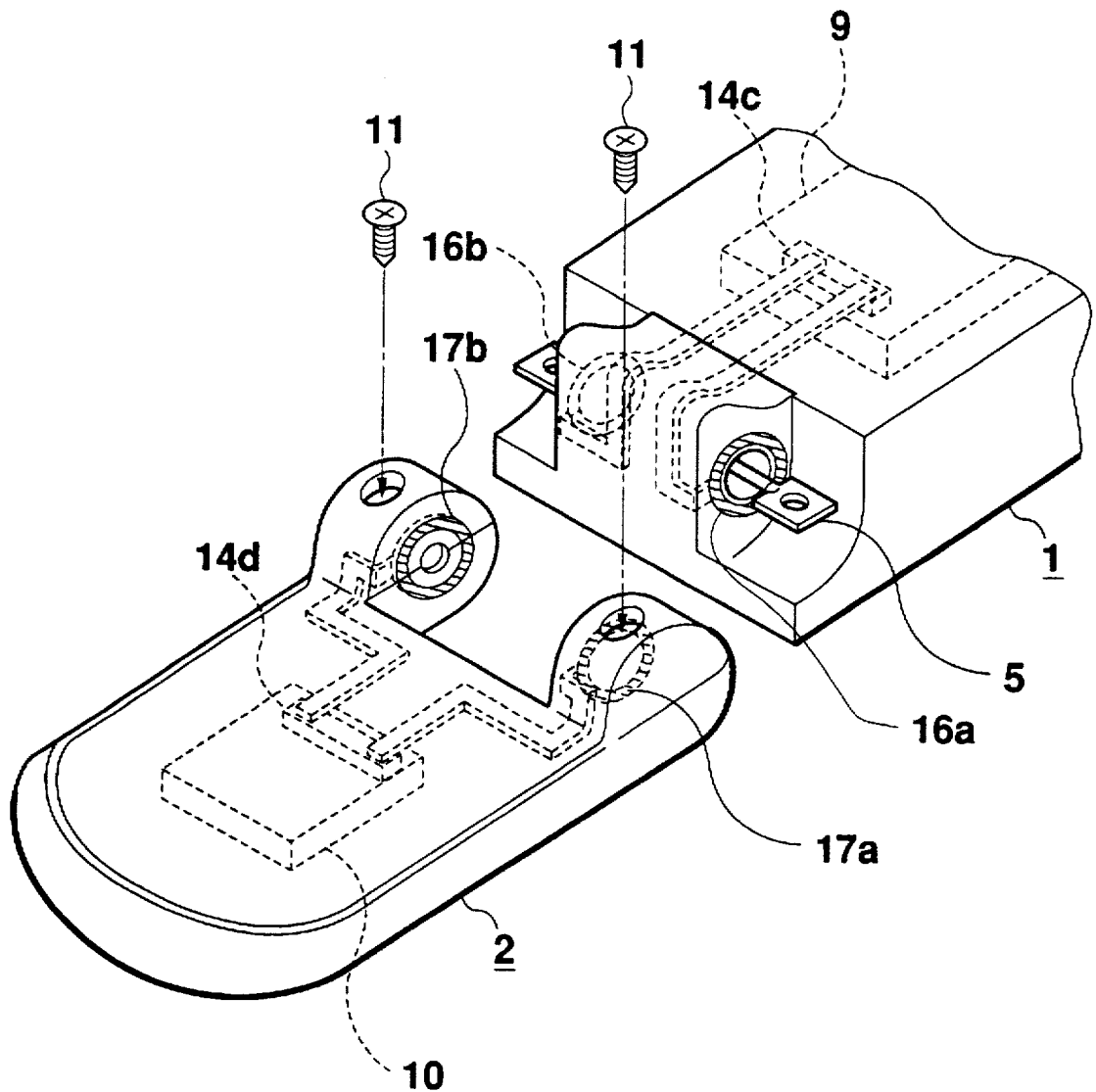
FIG. 10 is a perspective view of a portable telephone incorporating an opening and closing mechanism according to a seventh embodiment of the invention.

A seventh embodiment features that printed patterns are used as the distribution cables on both the main body and the sub-body, and differs from the sixth embodiment in this respect. As shown in FIG. 10, the main body 1 includes printed patterns 16a and 16b (equivalent to the distribution cables 7b, 8b in the sixth embodiment), while the sub-body 2 includes printed patterns 17a, 17b (equivalent to the distribution cables 7c, 8c). These printed patterns 16a, 16b, 17a and 17b are formed by the MID technique.

The printed patterns 16a and 16b are connected, at one end each thereof, to the electric circuit 9 via a contact type connector 14c, and include annular contact patterns surrounding the shaft 5 of the hinge unit 6 (the shaft 5 is not required to be conductive) at the other ends thereof.

In the sub-body 2, the printed patterns 17a, 17b are connected, at their ends, to the electric circuit 14 via a contact type connector 14d. At the ends opposite to the foregoing ends, the printed patterns 17a and 17b include annular contact patterns so as to surround the shaft 5. The annular contact patterns of the printed patterns 17a and 17b are identical to those of the printed patterns 16a and 16b. These annular contact patterns are contacted with one another so as to establish an electrical connection between them. In other words, the electric circuits 9 and 10 are connected via the annular contact patterns.

When the sub-body 2 is opened and closed, both of the annular printed patterns are continuously in slide contact with one another. Substantially no stress such as tension or compression acts on the printed patterns 16a, 16b, 17a and 17b, which prevents breaking and poor electrical connection. Further, when the sub-body 2 is assembled to the main body 1, the printed patterns 16a and 16b are connected to the printed patterns 17a and 17b via the annular contact patterns. Thus, the opening and closing mechanism has a simple structure, and can be assembled in a simplified manner. The reduction of components and simplified assembly work make the opening and closing mechanism less expensive.

Embodiment 8

Figure 11:
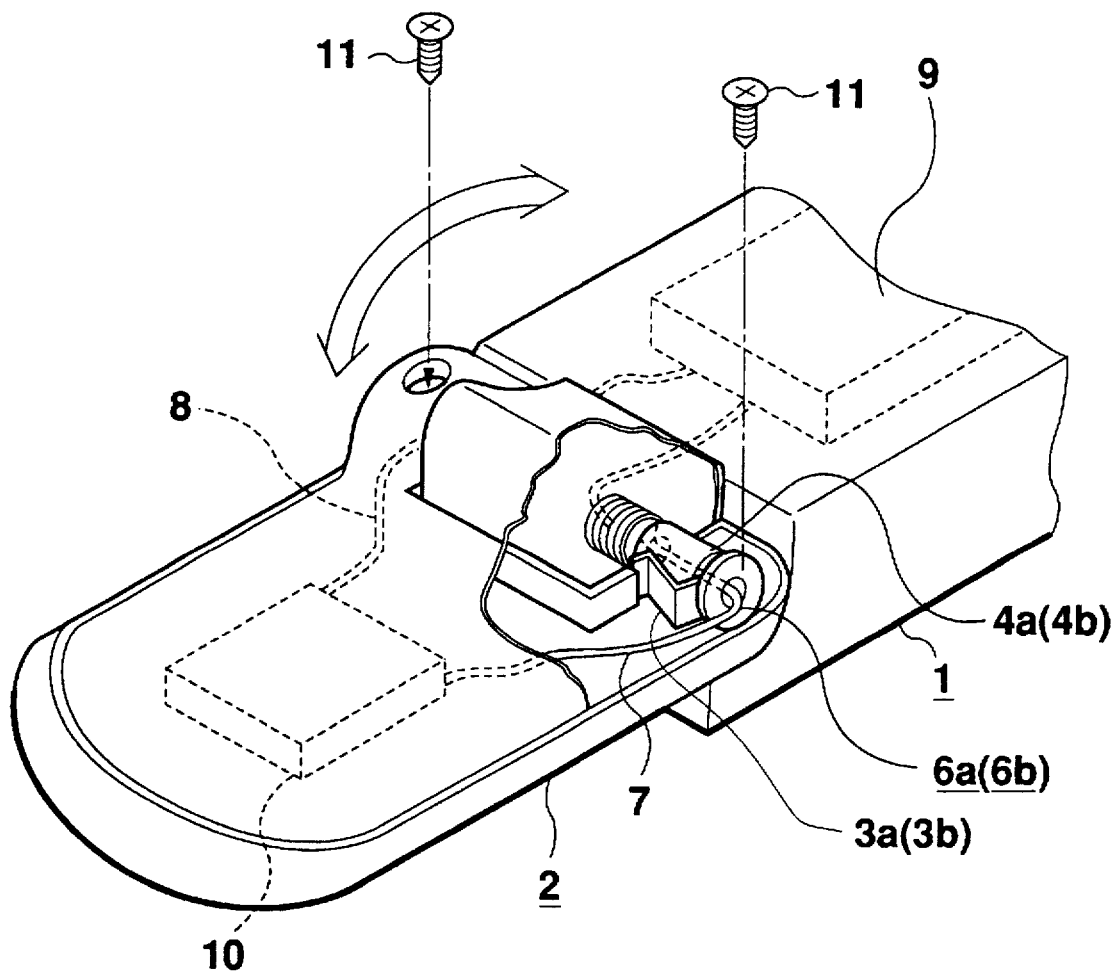
FIG. 11 is a perspective view of a portable telephone incorporating an opening and closing mechanism according to an eighth embodiment of the invention.
Figure 12:
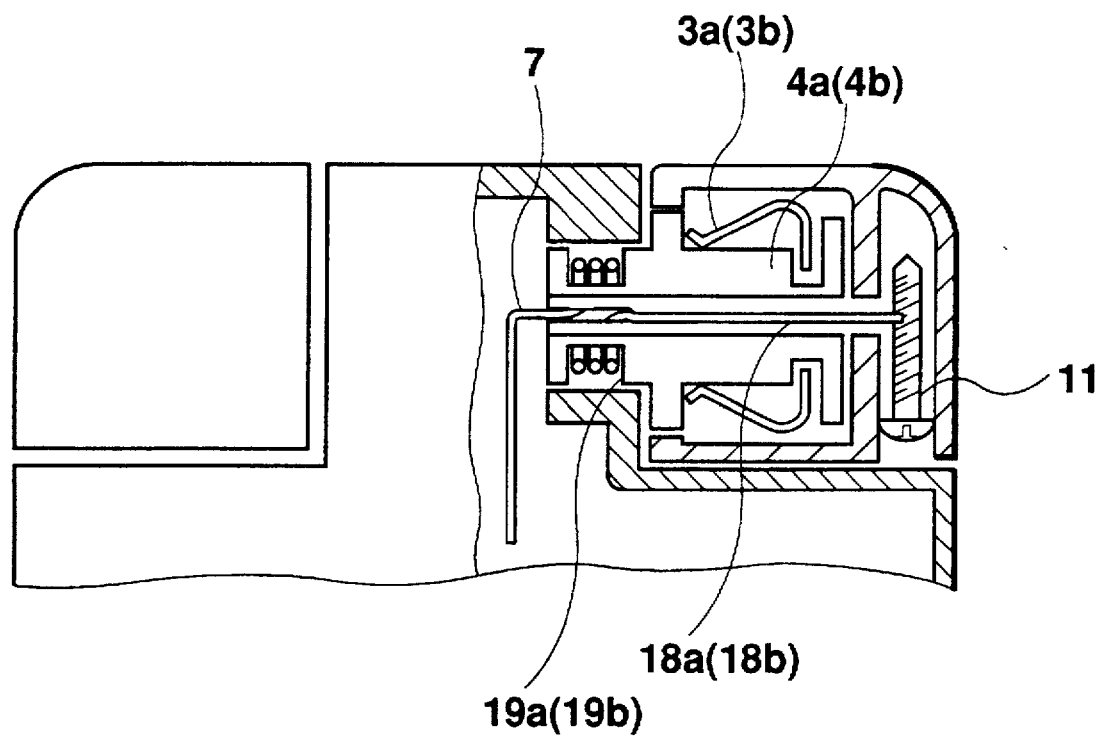
FIG. 12 is an enlarged cross section of the opening and closing mechanism of FIG. 11.
Figure 13:
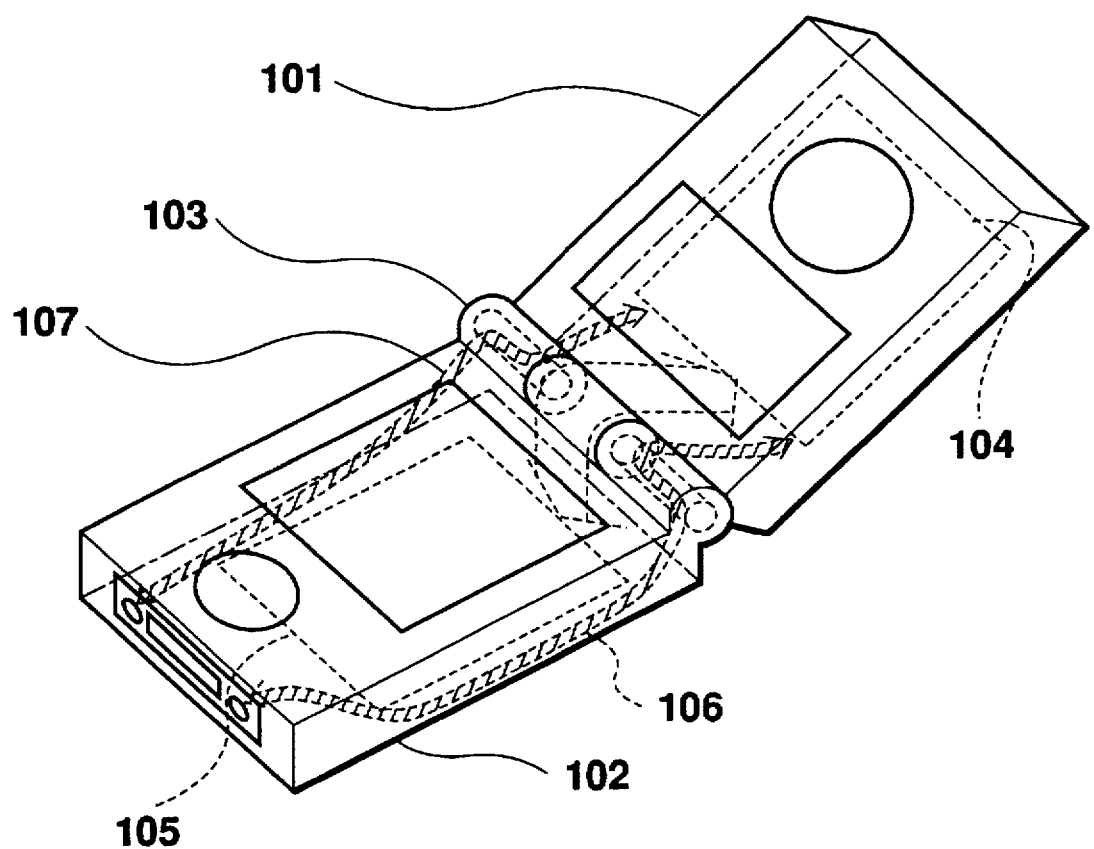
FIG. 13 is a perspective view of a portable telephone incorporating an opening and closing mechanism of the prior art.

An eighth embodiment features a pair of hinge units whose structure differs from those of the foregoing embodiments. As shown in FIGS. 11 and 12, a pair of hinge units 6a and 6b are positioned at opposite sides of the sub-body 2.

The right hinge unit 6a includes a cam 4a and an angle regulating leaf spring 3a. The cam 4a has a profile for determining opening and closing angles of the sub-body 2, and is held by the leaf spring 3a at portions for setting the opening and closing angles. Referring to FIG. 12, the cam 4a has a groove 19a around which a distribution cable 7 is wound, and a through-hole 18a. The through-hole 18a is formed in the cam 4a along the center axis thereof and used for passing the distribution cable 7 therethrough. The distribution cable 7 is connected at its one end to the electric circuit 9. At the other end, the distribution cable 7 enters into the through-hole 18a from an inner end of the cam 4a, comes out from the through-hole 18a, is wound around the groove 19a on the cam 4a, again enters into the through-hole 18a, passes through the through-hole 18a toward an outer end thereof, comes out of through-hole 18a via the outer end, and is connected to the electric circuit 10 of the sub-body 2. In this embodiment, the cam 4a also functions as the shaft 5a used in the first to seventh embodiments.

The left hinge unit 6b includes a cam 4b and an angle regulating leaf spring 3b, and is structured similarly to the right hinge unit 6a. The cam 4b has a groove 19b around which a distribution cable 8 is wound, and a through-hole 18b. The through-hole 18b is formed in the cam 4b along the center axis thereof and used for passing the distribution cable 8 therethrough. The distribution cable 8 is connected between the electric circuits 9 and 10 via the hinge unit 6b in a similar manner to the distribution cable 7 mentioned above.

In the eighth embodiment, the distribution cables 7 and 8 pass through the through-hole 18a and 18b in the cams 4a and 4b, and are wound in the grooves 19a and 19b on the cams 4a and 4b. Thus, the distribution cables 7 and 8 are stretched when the sub-body 2 is opened. Conversely, the distribution cables 7 and 8 are compressed when the sub-body 2 is closed. In other words, the distribution cables 7 and 8 are not twisted or untwisted when the sub-body 2 is opened or closed. This prevents the distribution cables 7 and 8 from breaking and poor electrical connection. The more loosely and the more times the distribution cables 7 and 8 are wound in the grooves 19a and 19b on the cams 4a and 4b, the less stress will be applied to the distribution cables 7 and 8, which is effective in protecting the cables 7 and 8 against breaking and poor electrical connection.

Further, a space for mounting electronic components or the like is available between the left and right hinge units 6a and 6b since the hinge units 6a and 6b are positioned near the left and right side edges of the sub-body 2.

The opening and closing mechanisms according to the invention are effective in preventing poor electrical connections between the bodies constituting the portable phone. Further, they can be efficiently assembled at a reduced cost.

What is claimed is:

1. An opening and closing mechanism for an electronic device, comprising:

a main body and a sub-body respectively including electric circuits;

a hinge unit for joining together one end of each of the main body and the sub-body, cam means, including a shaft, for setting opening and closing angles of said sub-body with respect to said main body, and an angle-regulating means for maintaining said cam means at a set angle;

a distribution cable for providing electrical connection between the electric circuit of the main body and the electric circuit of the sub-body, said distribution cable having an intermediate portion wound around said shaft; and a conductive, stretchable cable connected between said distribution cable and at least one of said electric circuits.

2. The opening and closing mechanism according to claim 1, wherein the electronic device is a flip type portable telephone.

3. The opening and closing mechanism according to claim 2, wherein the electric circuit of the main body is a radio circuit of the portable telephone, and the electric circuit of the sub-body is a control circuit of the portable telephone.

4. An opening and closing mechanism for an electronic device as set forth in claim 1, wherein said conductive, stretchable cable is connected between said distribution cable and the electric circuit of said main body.

5. An opening and closing mechanism for an electronic device as set forth in claim 1, wherein said conductive, stretchable cable is connected between said distribution cable and the electric circuit of said sub-body.

6. An opening and closing mechanism for an electronic device as set forth in claim 1, wherein said conductive, stretchable cable is connected between said distribution cable and the electric circuits of said main body and said sub-body.

7. An opening and closing mechanism for an electronic device as set forth in claim 1, wherein said conductive, stretchable cable is helical.

* * * * *